United States Patent [19]

Omata

[11] 4,426,181

[45] Jan. 17, 1984

[54] BINDER FOR PANELS

[75] Inventor: Nobuaki Omata, Hiroshima, Japan

[73] Assignee: Nifco Inc., Yokohama, Japan

[21] Appl. No.: 325,177

[22] Filed: Nov. 27, 1981

[30] Foreign Application Priority Data

Nov. 27, 1980 [JP] Japan .............................. 55-168751[U]

[51] Int. Cl.³ .............................................. F16B 13/04
[52] U.S. Cl. ....................................... 411/33; 24/662;
411/45; 411/58
[58] Field of Search ........................ 411/32, 33, 40, 41,
411/45, 58, 60, 75, 78; 24/216, 217 R

[56] References Cited

U.S. PATENT DOCUMENTS

| 2,271,899 | 2/1942 | Miller | 24/217 R X |
| 3,053,046 | 9/1962 | Fleming | 411/60 X |
| 4,017,945 | 4/1977 | Stanik | 24/217 R X |

FOREIGN PATENT DOCUMENTS

| 1094738 | 12/1954 | France | 411/57 |
| 1553436 | 12/1968 | France | 411/60 |
| 971370 | 9/1964 | United Kingdom | 411/41 |
| 1030952 | 5/1966 | United Kingdom | 411/60 |

Primary Examiner—Thomas J. Holko
Attorney, Agent, or Firm—Trexler, Bushnell & Wolters, Ltd.

[57] ABSTRACT

A binder for panels comprises a main binder part and a wedge member so constructed that the forced insertion of the wedge member into the main binder part causes the split portions formed in the main binder part to spread out and the expansion of the split portions serves to fasten two panels to each other. Into the main binder part set in the perforations formed in advance in the panels, the wedge member can be inserted from either of the outer surfaces of the two panels.

2 Claims, 5 Drawing Figures

BINDER FOR PANELS

BACKGROUND OF THE INVENTION

This invention relates to a binder for fastening two panels across a space to each other by forced insertion of a wedge member into a main binder part, and more particularly to a binder of the type which permits the wedge member to be inserted into the main binder part from either of the outer sides of the two panels being fastened.

Heretofore, numerous inventions have been proposed with respect to binders made of synthetic resin and used for fastening panels to each other. Many cases of actual adoption of such binders have been also known. Among these binders, those of one type share a common principle that wedge members are utilized for expanding the main binder parts and the phenomenon of this expansion of the main binder parts serves to fasten given panels to each other. A few actual examples of the use of binders of this type have already found public recognition.

Generally, the binder of the type which makes use of a wedge member has as its basic structure a main binder part formed in the shape of a tube and effects the fastening of two panels by causing this main binder part inserted through the perforations formed in advance in the panels and forcibly inserting the wedge member into the main binder part from either of the opposite ends thereof thereby expanding the main binder part against the edges of the perforations.

The binder using the wedge member is not fastened to the panels only owing to the resilience of its material. It is fastened to the panels because the forced insertion of the wedge member compels the main binder part to expand against the edges of the perforations in the panels. Since this binder can be expected to produce a strong binding force, it is advantageously used for providing powerful union of two panels.

Unfortunately, the binders of this type which have been heretofore proposed are so constructed that the forced insertion of their wedge members into the main binder parts is effected in only one direction. This directional selectivity has entailed a problems that, depending on the location, the binder cannot be used at all or it can be used only with much difficulty.

SUMMARY OF THE INVENTION

An object of this invention is to provide a binder so constructed that, at the time that the wedge member is forcibly inserted into the main binder part in fastening two panels across a space, the insertion of the wedge member can be made from either of the outer sides of the panels and, consequently, the panels can be fastened with high efficiency without any restriction as to the space required for the fastening work.

To accomplish the object described above according to the present invention, there is provided a binder which comprises a main binder part and a wedge member, the main binder part being in the form of a tubular shaft provided with a flange on the peripheral surface in the middle of the longitudinal extent thereof, four split pieces extending perpendicularly each from the upper and lower sides of the flange while involving a phase difference of 90° on the opposite sides of the flange, and raised portions formed one each at the upper extremities of the inner wall surfaces of one of the two pairs of opposed split pieces and one each at the lower extremities of the inner wall surfaces of the other pair of opposed split pieces, and the wedge member being formed of a head portion and a shank portion extending perpendicularly from the head portion and containing a diverged portion immediately below the head portion.

When the main binder part is first set in position in the perforations formed in advance in two panels so as to hold the panels in position as separated from each other with the flange interposed therebetween and then the wedge member is forcibly inserted into the main binder part, the raised portions on the inner wall surfaces of the split pieces and the diverged portion of the wedge member compel the main binder part to bulge against the perforations, particularly the edges thereof and, consequently, the bulged binder fastens the panels to each other. Into the main binder part set in advance in the perforations of the panels, the wedge member can be inserted from either of the outer sides of the panels at will. This freedom from the directional selectivity serves to eliminate the restriction as to the space required for the fastening work.

The other objects and characteristics of the present invention will become apparent from the further disclosure of the invention to be made hereinafter with reference to the accompanying drawings.

DESCRIPTION OF THE PREFERRED EMBODIMENT

Figure 1:
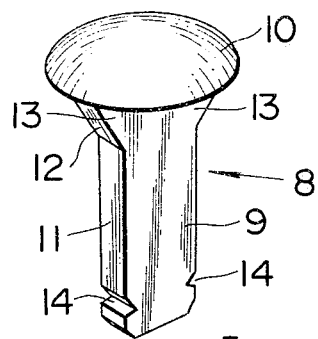
FIG. 1 is a perspective view of the binder of the present invention as held in a separated condition.

This invention relates to a binder which is capable of fastening two panels to each other in a state opposed to each other across a distance.

Now the binder of the present invention will be described with reference to the drawings showing one embodiment of this invention. A main binder part 1 which forms the basic part of the binder is provided integrally on the peripheral surface substantially in the middle of the longitudinal extent of a tubular shaft with a flange 2 having a prescribed thickness. This flange 2 divides the tubular shaft into one upper and one lower shaft. These upper and lower shafts are split by slits 3, 4 inserted inwardly from the outer ends of the shafts in a crossed state in the longitudinal direction to divide the upper and lower shafts each into four split pieces 5a, 5b. The upper and lower slits 3, 4 which are inserted in the crossed state as described above are made to occur in the respectively coinciding directions, so that the four split pieces 5a formed on the upper side of the flange 2 and the four split pieces 5b formed on the lower side of the flange 2 correspond to each other. In the four split pieces 5a, 5b each formed on the opposite sides of the flange, one of the two pairs of opposed split pieces 5a and one of the two opposed split pieces 5b involving a phrase difference of 90° on the opposite sides of the flange are provided on their inner wall surfaces with raised portions 6, 7, while the remaining pairs of opposed split pieces have smooth flat inner wall surfaces.

Figure 2:
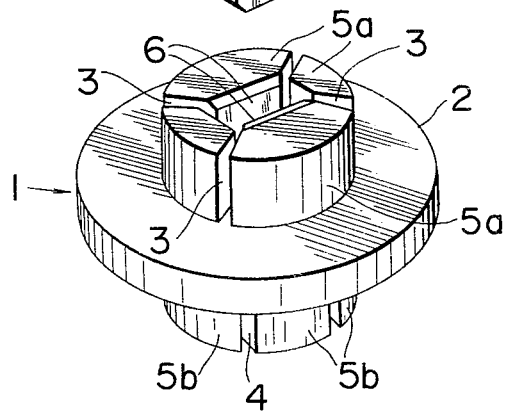
FIG. 2 is a plan view of the main binder part of the binder, with the wedge member left out.
Figure 2:
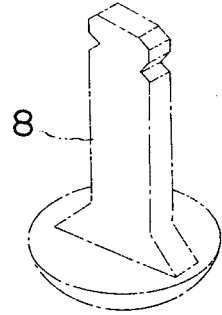
Figure 2:
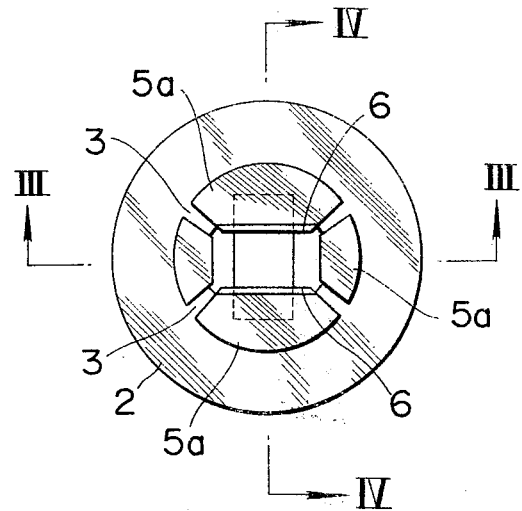

Of the split pieces 5a, 5b mentioned above, those containing the raised portions 6, 7 are given a greater width as shown in FIGS. 1 and 2. Because of the protuberance of the raised portions 6, 7 formed on the inner wall surfaces of the split pieces having the greater width, the cavities enclosed with four split pieces each have the outline of an oblong rectangle.

The wedge member 8 comprises a shank portion 9 having a cross section of the shape of an oblong rectangle and a head portion 10 integrally formed at the upper end of the shank portion. The opposite narrower surfaces 11 of the shank portion 9 are provided with a symmetrically diverged portion defined by slanted surfaces 12 which terminate in the lower side of the head portion 10.

The shank portion 9 in the wedge member has a cross section substantially equalling the outline of the cavity enclosed with the aforementioned four split pieces. This wedge member has a length greater than the distance between the leading ends of the upper and lower split pieces 5a, 5b of the main binder part 1.

The main binder part 1 and the wedge member 8 constructed as described above are separately formed of a thermoplastic synthetic resin. At the time of actual use, they are joined into each other to fasten two given panels. Now, the actual use of the binder will be described in detail below.

Figures 3, 4, 5:
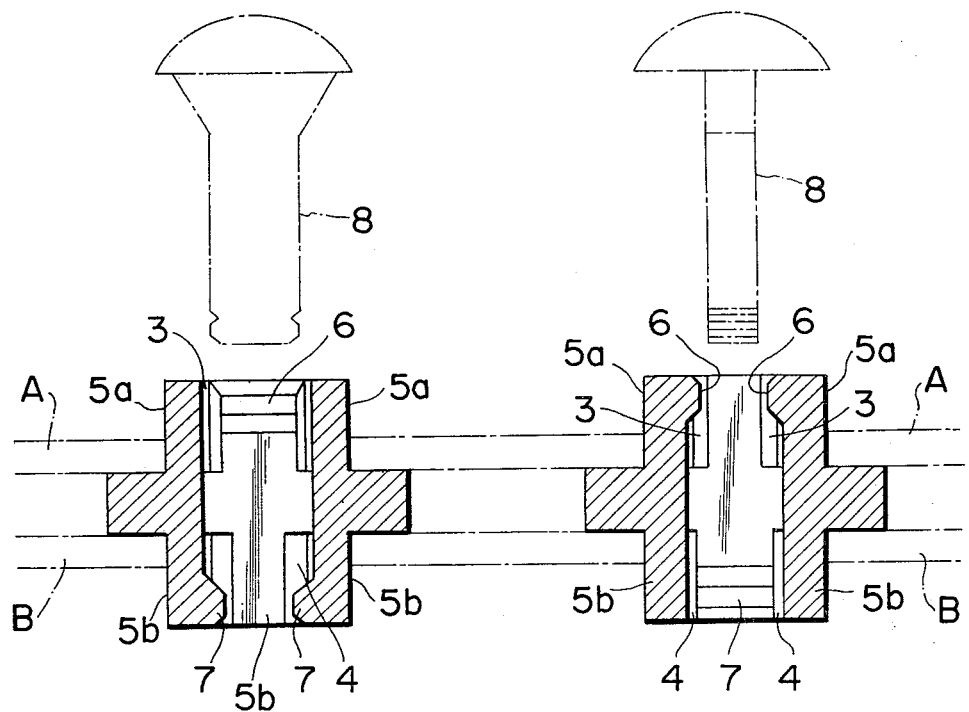
FIG. 3 is a sectional view taken along the line III—III in FIG. 2.
FIG. 4 is a sectional view taken along the line IV—IV in FIG. 2.
FIG. 5 is a partially sectioned front view illustrating the binder as holding two panels fast to each other.

FIG. 5 is a partially sectioned front view showing the condition in which two panels A, B are fastened to each other by the union of the main binder part and the wedge member, by way of illustration of the actual use of the binder. The panels A, B to be fastened have perforations a, b formed in advance therein, which perforations have a diameter slightly greater than the outside diameter of the four split pieces 5a of the main binder part, i.e. the outside diameter of the tubular shaft constituting the basic structure of the main binder part. The upper and lower split pieces 5a, 5b of the main binder part are passed through the perforations of the two panels until the two panels are opposed to each other across the flange 2 now interposed therebetween. Subsequently, the wedge member 8 is pushed into the cavity enclosed with the aforementioned split pieces 5a or 5b protruding from either of the outer surfaces of the panels until the lower side of the head portion 10 collides with the leading ends of the relevant split pieces. Consequently, the wedge member is joined fast to the main binder part.

In this case, the wedge member 8 is inserted in a posture such that the direction of the shank portion 9 coincides with that of the cavity of a section of the shape of an oblong rectangle enclosed with the split pieces 5a (or 5b). Consequently, the insertion of the wedge member into the cavity of the split pieces 5a (or 5b) is effected without use of any immoderate force because the narrower faces 11 of the shank portion are now opposed to those of the split pieces containing the raised portions 6 (or 7). The shank portion 9 is inserted in this manner. As this insertion is continued until the shank portion reaches the cavity enclosed with the split pieces 5b (or 5a) on the opposite side, the narrower surfaces 11 of the shank portion 9 collides with the raised portions 7 (or 6) of the split pieces. When the insertion is further continued in spite of this collision, the raised portions 7 are pushed aside by the narrower surfaces of the shank portion. Consequently, the split pieces 5b which contains the raised portions are bent outwardly and expanded outside the perforation as illustrated in the drawing. At the same time that the insertion is made, the slanted surfaces of the diverged portion 13 provided at the upper end of the shank portion 9 force their way into the inner wall surfaces of the split pieces 5a not containing any raised portion and push these split pieces outwardly. By the forced insertion of the wedge member, therefore, the split pieces 5a on the side of starting the insertion and the split pieces 5b on the opposite side are bulged together to press the panels toward each other.

In the embodiment illustrated, the wedge member 8 is opposed downwardly to the two panels A, B laid in advance parallelly to each other and then joined with the main binder part by causing the shank portion 9 thereof inserted into the cavity enclosed with the four split pieces 5a protruding upwardly from the perforation a of the panel A. As already described above, the four split pieces 5a, 5b disposed on the upper and lower sides of the flange 2 of the main binder part 1 are formed in an entirely identical structure with a phase difference of 90° involved between the split pieces containing the raised portions 6, 7. Thus, the wedge member 8 can be inserted into the main binder part in either of the two directions simply by having the direction of the shank portion 9 (namely, the direction of the two narrower surfaces 11) changed by 90° to suit the occasion. The effect of the binder is not changed by the direction of the insertion of the wedge member.

Once the wedge member has been completely inserted into the main binder part, it is desired not to come loose easily from the main binder part. For this purpose, it is desirable for the shank portion 9 to be provided in the narrower surfaces near the leading end thereof with grooves 14 adapted to fit on the raised portions 7 or 6 of the split pieces.

As described above, the binder of the present invention enables two panels to be fastened to each other by passing into the perforations formed in advance in the panels the split pieces formed on the opposite sides of the flange and subsequently forcing the wedge member into the cavity enclosed with the split pieces. And this insertion of the wedge member into the split pieces can be effected in either of the opposite directions. Thus, this binder proves highly advantageous where the insertion of the wedge member in one direction is not obtained at all or obtained with much difficulty.

What is claimed is:

1. A binder for panels, comprising a main binder part and a wedge member, said main binder part being formed of a tubular shaft, a flange of a prescribed thickness disposed on the peripheral surface substantially in the middle of the longitudinal extent of said tubular shaft, four slits inserted perpendicularly into the upper and lower shafts on the opposite sides of said flange inwardly from the outer ends of said upper and lower shafts with the directions of said slits coinciding on the opposite sides of said flange, said slits dividing the upper and lower shafts each into four split portions in a manner producing a phase difference of 90° on the opposite sides of said flange, and raised portions formed one each on the inner wall surfaces of one of the two pairs of opposed split pieces on the upper and lower sides of said flange, said selected pairs of opposed split portions involving said phase differences, and said wedge member being formed of a shank portion having a cross section of the shape of an oblong rectangle and a head portion integrally disposed at the upper end of said shank portion, with the opposite narrower surfaces of the shank portion diverged upwardly in the upper portion of said shank portion bordering on the lower side of said head portion, whereby said wedge member is opposed to either of the end faces of the upper and lower shafts of said main binder part and then passed through the cavity enclosed with the four split portions and pushed into the four split portions on the opposite side so that the narrower surfaces at the leading end of the shank push outwardly the raised portions formed on the inner wall surfaces of one of the pairs of opposed split portions and expand the pair of split portions and, at the same time, the diverged portion at the upper end of the shank portion forces its way into and consequently expands the other pair of opposed split portions containing no raised portion.

2. The binder for panels according to claim 1, wherein the wedge member is provided in the narrower surfaces near the leading end thereof with grooves adapted to fit on said raised portions.

* * * * *